United States Patent [19]

Sobczak et al.

[11] Patent Number: 5,342,090
[45] Date of Patent: Aug. 30, 1994

[54] PASSENGER AIR BAG MODULE WITH MEANS FOR RETAINING AN AIR BAG DEPLOYMENT DOOR TO A HOUSING

[75] Inventors: Greg Sobczak, New Baltimore; Mark R. Sturza, Mt. Clemens, both of Mich.

[73] Assignee: AlliedSignal Inc., Morristown, N.J.

[21] Appl. No.: 89,062

[22] Filed: Jul. 8, 1993

Related U.S. Application Data

[63] Continuation of Ser. No. 968,707, Oct. 30, 1992, abandoned.

[51] Int. Cl.$^5$ .............................................. B60R 21/16
[52] U.S. Cl. ....................................... 280/732; 49/397; 280/728 B
[58] Field of Search ............... 280/732, 728 R, 728 A, 280/731, 728 B; 49/397, 465

[56] References Cited

U.S. PATENT DOCUMENTS

| | | | |
|---|---|---|---|
| 4,893,833 | 1/1990 | DiSalvo et al. | 280/732 |
| 4,941,678 | 7/1990 | Lauritzen et al. | 280/732 |
| 5,167,427 | 12/1992 | Baba | 280/728 |

*Primary Examiner*—Eric Culbreth
*Attorney, Agent, or Firm*—Markell Seitzman

[57] ABSTRACT

An assembly for an air bag (56) adapted to fit within an opening (22) of a vehicle part (20) including: a housing (44) including: a first wall (100) and an opposite second wall (102), a flexible wall member (106) secured to the first wall (100) defining a space (150) therebetween, one of the first wall (100) and flexible wall member (106) including a plurality of first tabs (112) extending into the space (132), the second wall (102) including a plurality of locating tabs (120) and latching tabs extending outwardly therefrom; a deployment door or cover (30, 40, 42) for enclosing the housing including a hinge portion (40), received in the space, engagable with the first tabs (112) to provide a snap connection therebetween and a seam portion (42) including seam flange (76) engageable with the locating tabs, the seam flange being latched in place by the latching tabs (122) to secure the seam portion (42) to the housing.

13 Claims, 5 Drawing Sheets

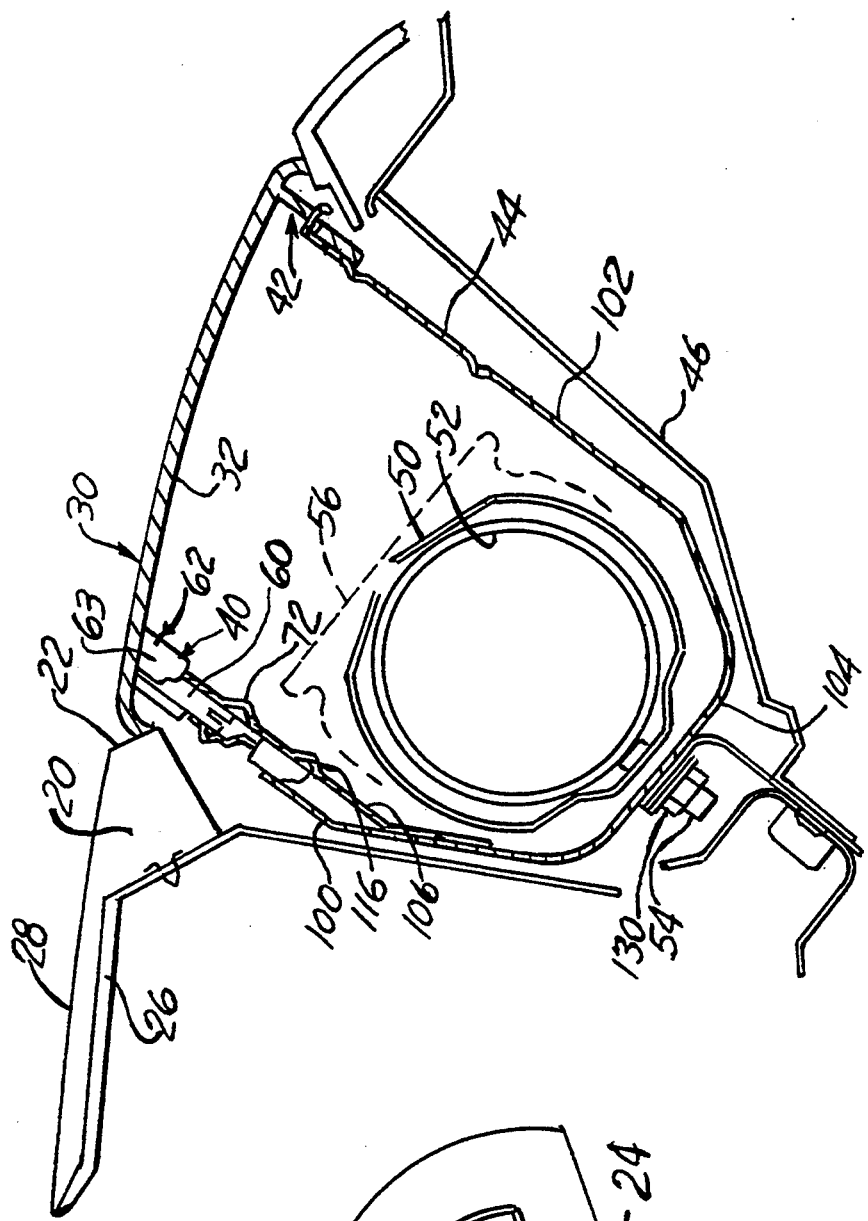

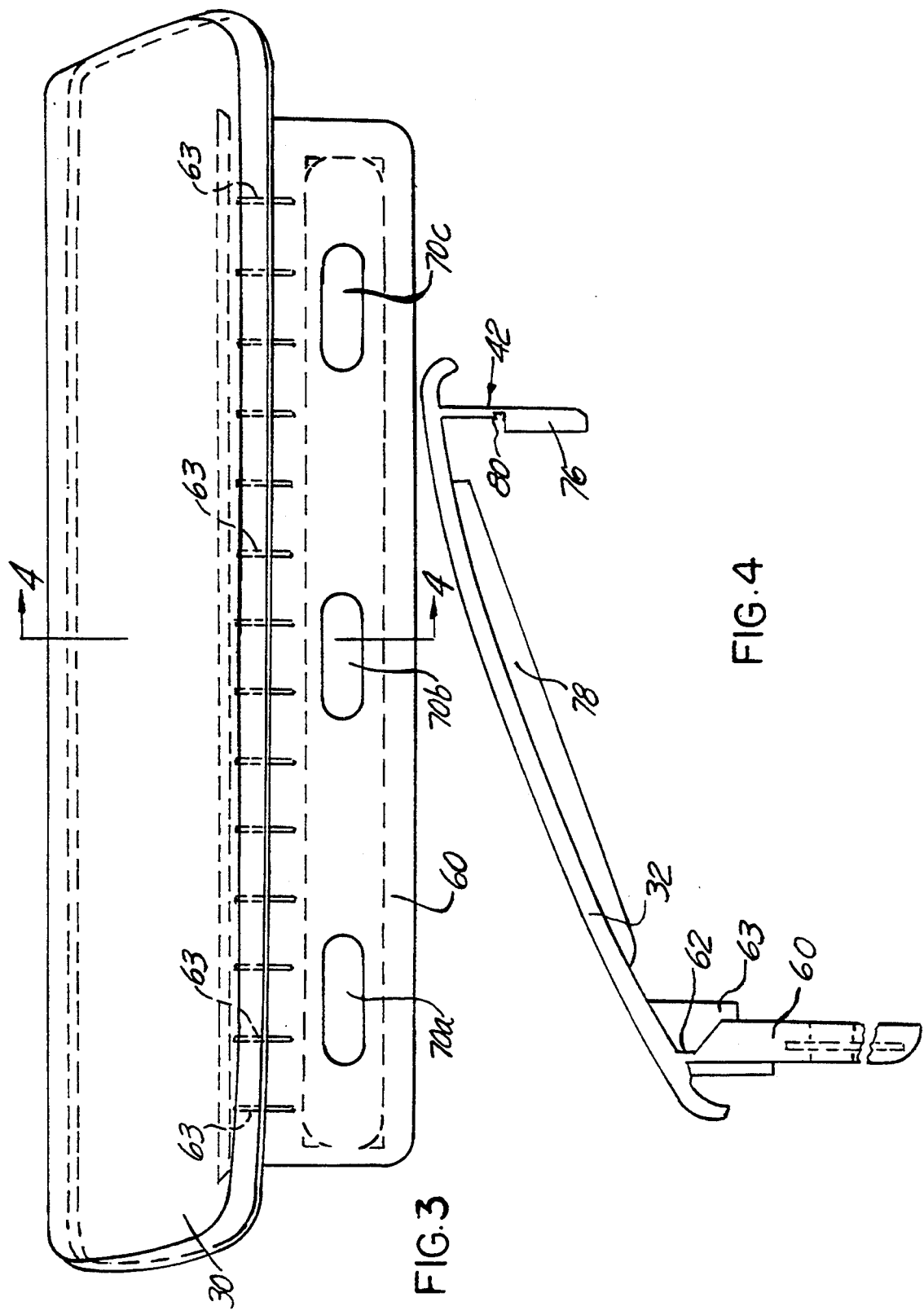

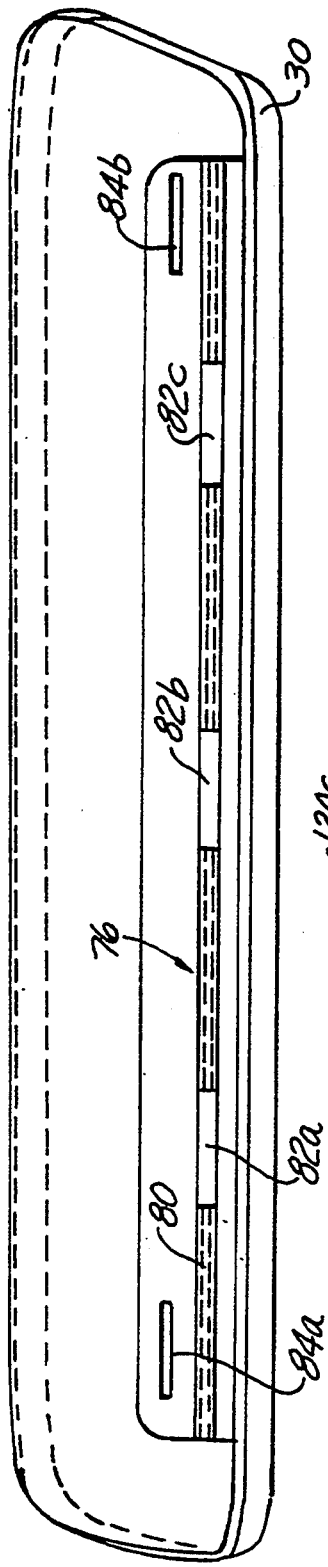
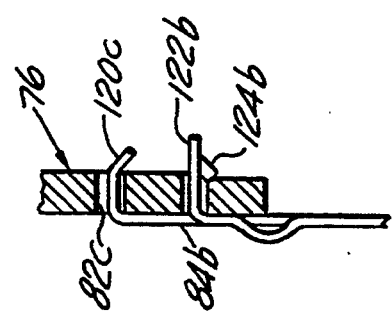
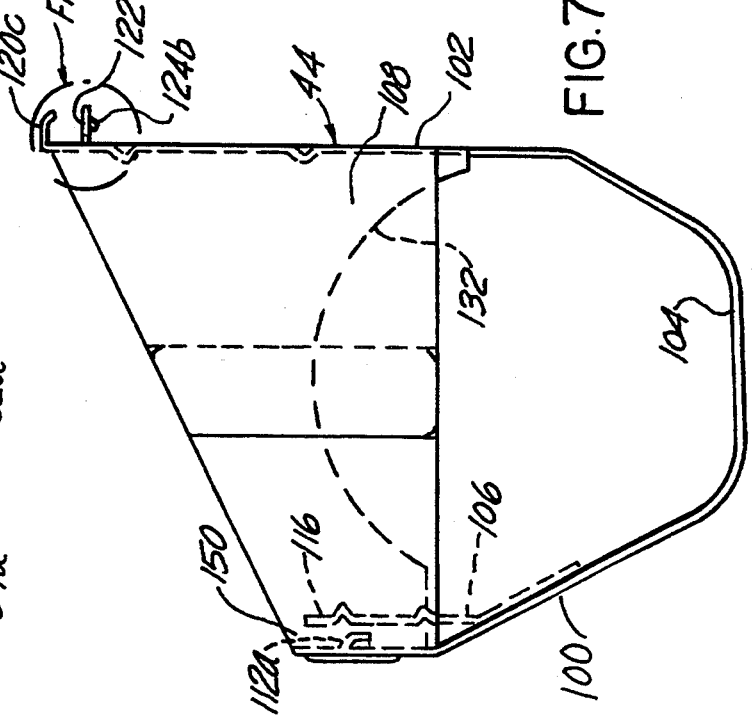

ial panel. The deployment door 30 includes an integrally formed hinge portion 40 extending from the substrate 32 and a frangible and interlocking seam portion generally shown as 42. The hinge portion 40 and structure surrounding the seam 42 are snap fit within a canister, housing or reaction can 44. The housing 44 is typically fastened to a structural component 46 situated below the instrument panel 20. Positioned within the reaction can or housing 44 is a retainer 50 which surrounds a gas generator 52 of known variety and fastened by a plurality of bolts 54. An air bag 56 is mounted about the member 50. The air bag 56 may be secured in its folded configuration by utilizing a tearable fabric layer (not shown) as is known in the art.

PASSENGER AIR BAG MODULE WITH MEANS FOR RETAINING AN AIR BAG DEPLOYMENT DOOR TO A HOUSING

This application is a continuation of application Ser. No. 07/968,707 filed Oct. 30, 1992 now abandoned.

BACKGROUND AND SUMMARY OF THE INVENTION

The present application generally relates to an air bag safety system and more specifically to a passenger side air bag system including a housing and deployment door which does not use external fasteners.

U.S. Pat. No. 4,893,833 illustrates a passenger side deployment door having a single, flexible hinge along one side and a frangible member along another side of the cover. The frangible member breaks apart in response to air bag deployment forces permitting the cover to rotate about the hinge. The hinge and frangible member are attached to cooperating structure by external fasteners such as bolts, nuts or rivets, received through bolt/rivet holes which make the assembly process more complicated than necessary. In addition, the bolt/rivet holes provide a source of increased stress within the various portions of the door.

It is an object of the present invention to provide an improved methodology for retaining an air bag deployment door to its related housing. Accordingly the invention comprises: an assembly for an air bag adapted to fit within an opening of a vehicle part, such as an instrument panel. The assembly comprising: a housing having a first wall and an opposite second wall, and a flexible wall member secured to the first wall defining a space therebetween. One of the first wall and flexible wall members includes a plurality of first tabs extending into the space. The second wall includes a plurality of locating tabs and latching tabs extending outwardly therefrom to engage a portion of a deployment door. The deployment door includes a hinge portion, received in the space between the first wall and flexible wall, engagable with the first tabs to provide a snap connection therebetween and a seam portion including seam flange engagable with the locating tabs. The seam flange being latched in place to the housing by the latching tabs.

Many other objects and purposes of the invention will be clear from the following detailed description of the drawings.

BRIEF DESCRIPTION OF THE DRAWINGS

In the drawings:

FIG. 1 diagramatically illustrates the right hand portion of a vehicle instrument panel showing a deployment door fitted therein.

FIG. 2 illustrates a cross-sectional view showing many of the major components of the present invention.

FIG. 3 illustrates a rear plan view of a deployment door showing its integral hinge flange.

FIG. 4 is a cross-sectional view through section 4—4 of FIG. 3 showing an enlarged view of the deployment door.

FIG. 5 illustrates a front plan view of a seam flange portion of the door.

FIGS. 7–9 illustrate an end, side and top views of the housing.

FIG. 10 illustrates a locking tang.

DETAILED DESCRIPTION OF THE DRAWINGS

Figure 6:
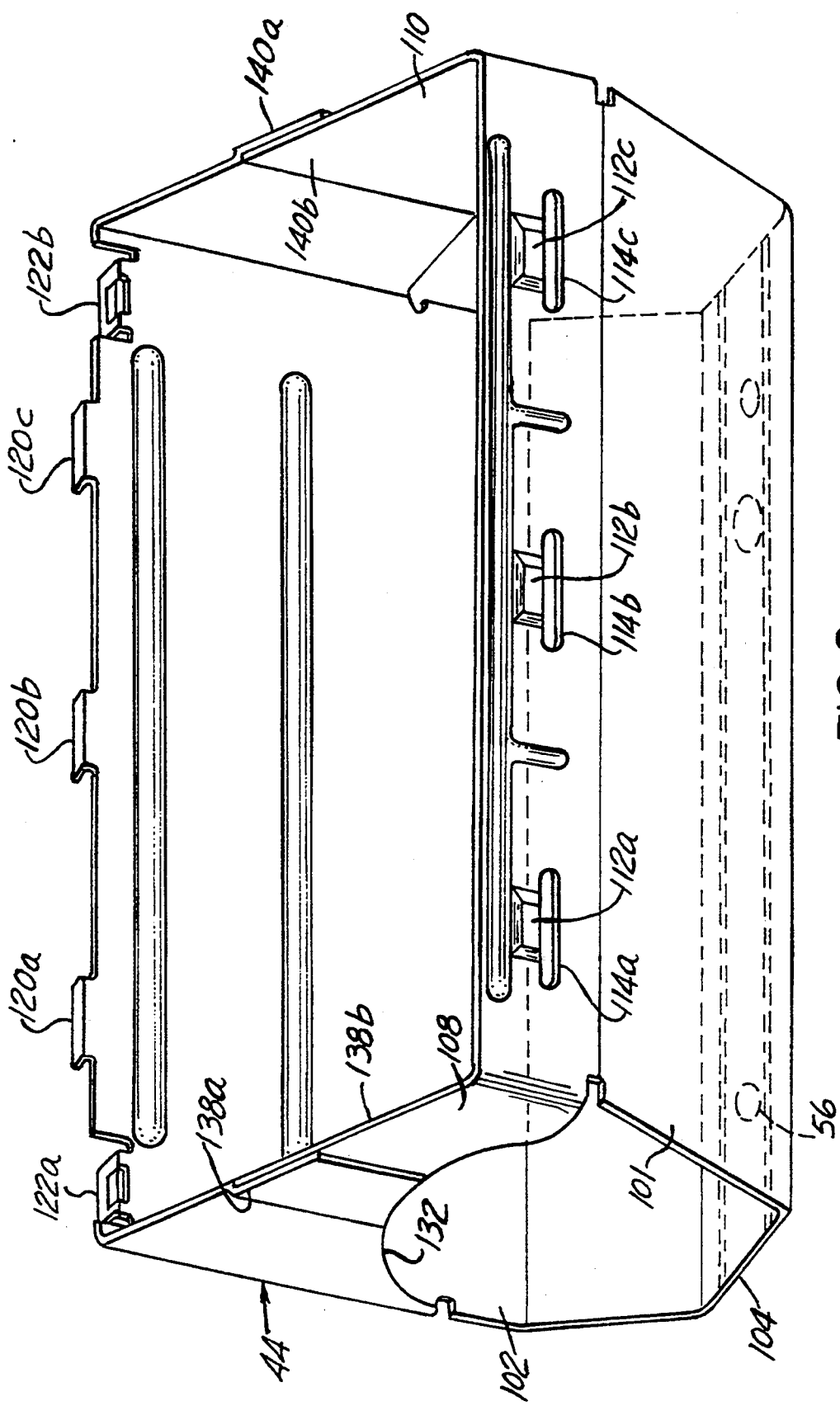
FIG. 6 illustrates an isometric view of the housing.

FIG. 1 diagrammatically illustrates the right hand portion of a vehicle instrument panel generally shown as 20. Visible in this diagram is the top of an air bag deployment door 30 which is fitted within an opening or recess 22 of the instrument panel or other passenger component. As can be appreciated from FIG. 1, the location of the deployment door is proximate the top of the instrument panel and as such this arrangement is often called a top mounted orientation or configuration. As can be appreciated the opening 22 can be moved forwardly as shown by arrow 24 to a front mounted configuration in which the deployment door is essentially mounted facing more toward the occupant.

With reference to FIG. 2, there is illustrated a cross-sectional view of the instrument panel 20 showing the opening 22. Fitted within the opening 22 is the deployment door 30. As can be seen from FIG. 2, the construction of the instrument panel and that of the deployment door can be fabricated of a layered construction. As is known in the art, the instrument panel may be made of a plastic or metal underment or substrate shown as 26 covered with an expanded vinyl 28, foam or both. As shown the door 30 uses a thermoplastic (TPO) substrate 32 which may be covered by vinyl, rubber, foam and the like to match the look and feel of the instrument panel. The deployment door 30 includes an integrally formed hinge portion 40 extending from the substrate 32 and a frangible and interlocking seam portion generally shown as 42. The hinge portion 40 and structure surrounding the seam 42 are snap fit within a canister, housing or reaction can 44. The housing 44 is typically fastened to a structural component 46 situated below the instrument panel 20. Positioned within the reaction can or housing 44 is a retainer 50 which surrounds a gas generator 52 of known variety and fastened by a plurality of bolts 54. An air bag 56 is mounted about the member 50. The air bag 56 may be secured in its folded configuration by utilizing a tearable fabric layer (not shown) as is known in the art.

The hinge portion 40, includes a hinge flange 60 and a hinge 62 formed at the intersection of the hinge flange 60 with the thermoplastic substrate 32 of the deployment door or cover 30. The hinge flange 60, which is fabricated of a thermoplastic, is molded about a metal reinforcement member 72. The reinforcement member 72 and hinge flange 60 include a plurality of depressions or openings 70a–c as shown in FIG. 3. FIG. 3 illustrates a plan view showing the hinge flange 60 as well as the metal reinforcement member 72. Extending rearwardly from the hinge flange 60 can be seen the top portion of the deployment door 30 extending away at an angle relative to the hinge flange 60. As also can be seen from FIG. 4, the thickness of the hinge flange 60 is much greater than the thickness of the substrate 32. The design of the hinge 62 must be robust in that the hinge absorbs the relatively high deployment forces generated on inflation of the air bag 56. However, if the hinge 62 is manufactured having a thickness equal to that of the hinge flange 60, the deployment door 30 may not rotate (about the hinge 62) as free or as fast as required. As can be seen from FIGS. 3 and 4 (FIG. 4 is a cross-sectional view through section 4—4 of FIG. 3) that the hinge 62 comprises a narrowed section of the substrate, to facilitate rotating, and further includes additional reinforcement bars 63 (one of which is shown in both FIGS. 2 and 4). Also visible in FIG. 4 is a more detailed view of the frangible seam portion 42 of the door 30. The seam portion 42 comprises a seam flange 76 integrally formed as part of the substrate 32. As can also be seen from FIG. 4, the substrate, at a lower surface thereof, includes a plurality of reinforcement ribs 78 extending from the front to the rear of the substrate 32. The seam flange 76 includes a tear seam 80 which extends across the length of the seam flange 76. The tear seam comprises a thin portion of the substrate formed in a notch. The notch may be U-shaped or V-shaped to facilitate tearing of the seam flange 76 from the other portions of the door 30.

Reference is made to FIG. 5 which illustrates a plan view of the seam flange portion 76 of the deployment door 30. For reference purposes the top portion of the door extends from the lower portion of the seam flange 76. As illustrated in FIG. 5 the seam flange 76 and door 30 are shown upside-down. The seam flange 76 includes a plurality of openings 82a–82c which as described below will be utilized to locate the seam flange 76 relative to the housing 44. In addition, the seam flange also includes another plurality of latching openings 84a and 84b which are engaged by latches positioned on a portion of the housing 44.

Figure 9:
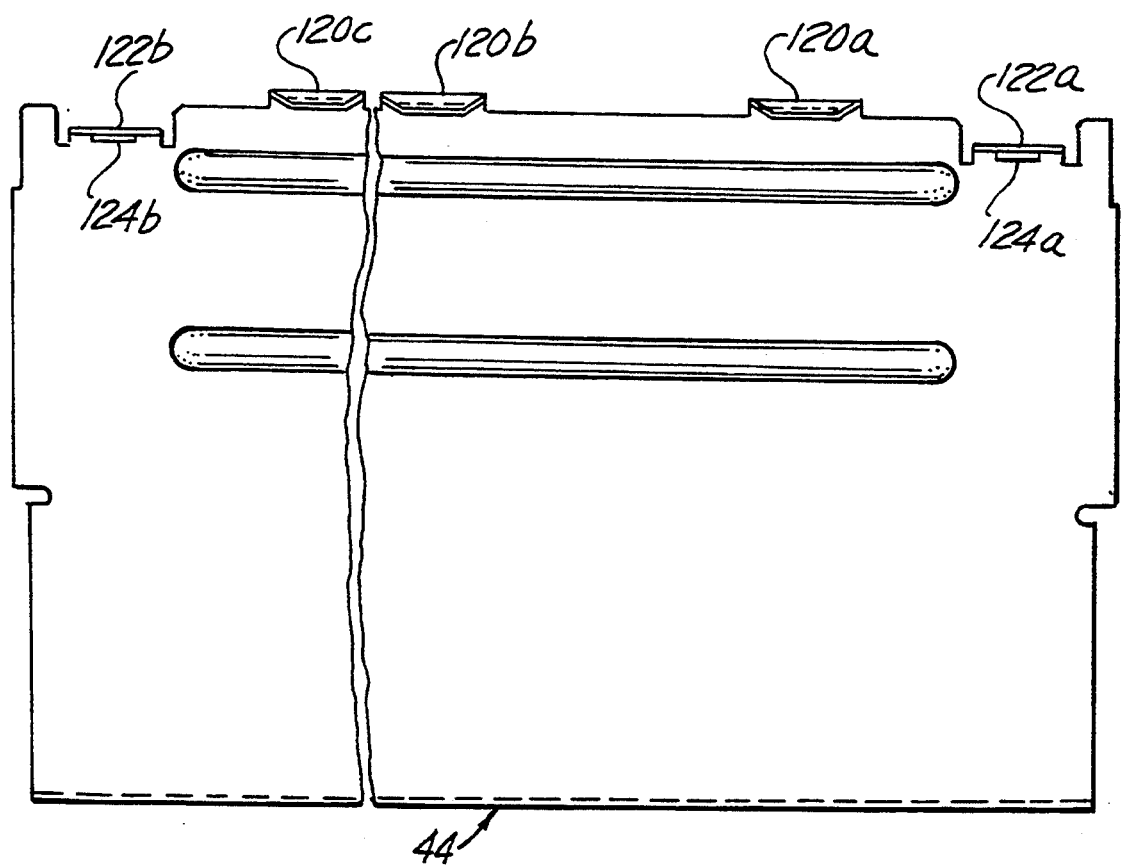
Figure 8:
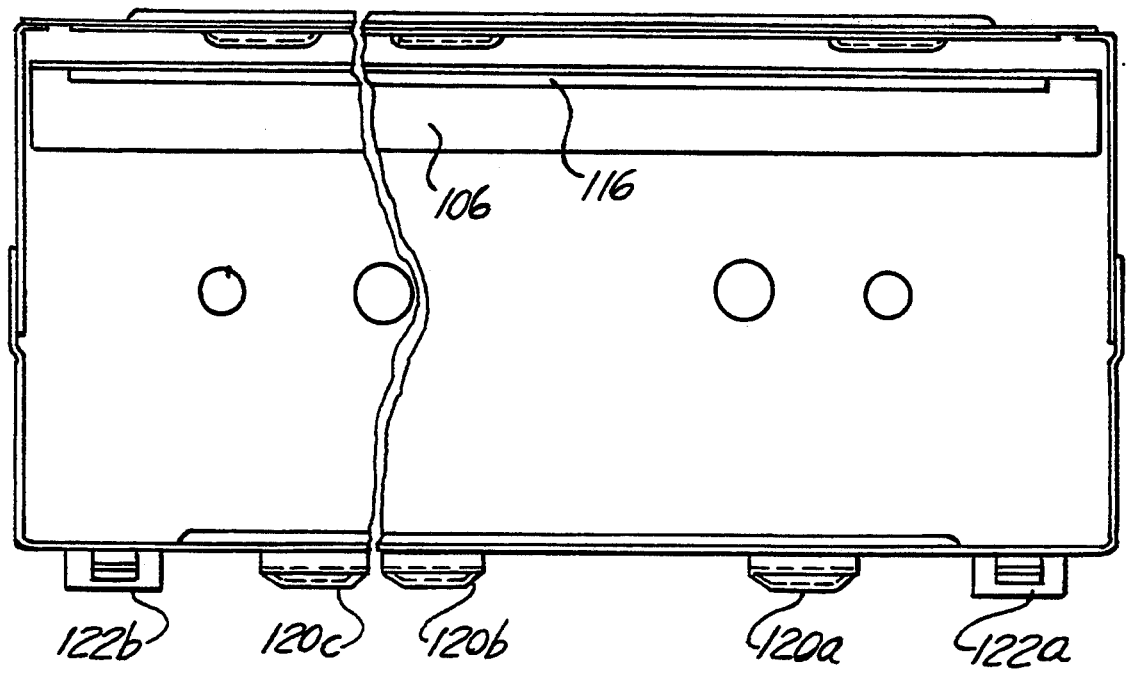

Reference is again made to FIG. 2 as well as to FIGS. 6 through 9. FIG. 6 illustrates an isometric view of the housing 44 and FIGS. 7–9 illustrate end, side and top views of the housing 44. As can be seen the housing 44 comprises a generally U-shaped structure having a first outer wall 100 and a second outer wall 102 joined by bottom 104. In the embodiment illustrated the second outer wall is slightly higher than the first outer wall 100 to accommodate the angled mounting of the housing 44 to the instrument panel 20. Welded inside the first wall 100 is a flexible wall or liner 106. The liner 106 essentially spans the length of the outer wall 100, however, the flexible liner 106 is slightly shorter than wall 100 so that it is free to move relative to ends 108 and 110 of the housing. As can be seen from FIG. 6, part of the outer wall 100 has been removed forming a plurality of openings 114a–c. The wall 100 just above each opening 114a–c is bent inwardly to define a like plurality of tabs or recesses 112a–c. One such tab 112a is shown in FIGS. 2 and 7. The spacing of the tabs 112a–c correspond to the spacing of the openings 70a–c on the hinge flange 60 to facilitate snap engagement with the hinge flange. As can be seen from the various figures, the wall 106 is formed with an axially extending groove 116 to increase its structural rigidity. Similar grooves are on walls 100 and 102.

With regard to wall 102 of the housing 44 it can be seen especially from FIGS. 6–9, that the wall 102 includes a plurality of extending locating tabs 120a–c. The spacing of these tabs 120a–c corresponds to the spacing of the locating openings or slots 82a–c formed in the seam flange 76. Also formed on wall 100 are two interlocking elements 122a and 122b positioned at opposite ends of the wall 106. Each interlocking unit 122a,b comprises a locking tang 124a,b. One such locking tang 124a is shown more clearly in FIG. 10.

The above-described components are assembled as follows: The air bag 56 is secured to the retaining member 50 forming a subassembly. The subassembly is secured to the housing 44 such as by inserting the threaded bolts 54 through corresponding openings 56 (see FIG. 6) in the housing 44. A fastener such as nut 130 is used to secure the bolts and the retaining member 40 to the housing 44 (see FIG. 2). The gas generator 52 is later inserted into the housing 44 and into the retaining member 50 through the open end 132 formed in the housing 44.

With regard to the housing 44, it can be seen that the housing is basically fabricated of a single sheet of metal bent to the shape as illustrated in FIG. 6 with the various ends 108 and 110 formed by bent over flanges 138a,b and 140a,b which are secured together such as by welding. The deployment door or cover 30 is secured to the housing 44 in the following manner. The seam flange 76 of the door 30 is correctly located relative to the housing 44 by inserting the locating tabs 120a–c into the corresponding openings 82a–c. The hinge flange 60 is then positioned at the top of the space 150 between the outer wall 100 and the flexible liner 106. Thereafter, the hinge flange 60 is urged downwardly into the space 150 whereupon the tabs 112a–c lockingly engage with the openings 70a–c provided in the hinge flange 60. As can be seen from the above, the seam flange 76 has now been properly located relative to the housing 44 by the locating tabs 120a–c and the hinge flange 60 has been lockingly engaged to the housing via the snap coupling between the tabs 112a–c and openings 70a–c. All that needs to be done is to now lockingly engage the seam flange 76 to the housing. This is done by pressing the seam flange 76 inwardly such that openings 84a–c pass over the locking units 122a and 122b. Thereafter the seam flange 76 is pressed against the wall 102 permitting the seam flange 76 to overtravel relative to the tangs 124a and 124b whereupon the tangs 124a and b lock the seam flange 76 in place. Reference is briefly made to FIG. 10 which shows the seam flange 76 in its locked orientation relative to the tangs 124. Also visible in FIG. 10 is one of the locating tabs such as 120a extending through the seam flange 76.

Many changes and modifications in the above described embodiment of the invention can, of course, be carried out without departing from the scope thereof. Accordingly, that scope is intended to be limited only by the scope of the appended claims.

We claim:

1. An assembly for an air bag (56) adapted to fit within an opening (22) of a vehicle part (20) comprising:
   a housing (44) comprising: a first wall (100) and an opposite second wall (102), a flexible wall member (106) secured to the first wall (100) defining a space (150) therebetween, one of the first wall (100) and flexible wall member (106) including a plurality of first tabs (112) extending into the space (150), the second wall (102) including a plurality of locating tabs (120) and latching tabs (122;124) extending outwardly therefrom;
   cover means (30, 40, 42) for enclosing the housing including first means, received in the space (150), including a hinge portion (40) engagable with the first tabs (112) to provide a snap connection therebetween and a seam portion (42) including second means (76, 82) engageable with the locating tabs and third means (76;84) being latched by said latching tabs to secure the seam portion to the housing, the seam portion including a tear seam (80) which tears apart in response to deployment forces generated by an inflating air bag.

2. The assembly as defined in claim 1 wherein the cover means comprises a cover (30), and wherein a hinge flange (60) integrally extends from the cover, and wherein the hinge portion (62) is formed proximate a junction of the hinge flange (60) and the cover (30), and wherein the second mean includes a seam flange (76) formed as an integral part of the cover (30) generally opposite the hinge flange (60) and wherein the tear seam (80) is at the junction of the seam flange (76) to the cover, the hinge flange (60) including a plurality of receptacles (70) engagable with a corresponding one of the first tabs (112) when the hinge flange (60) is inserted between the first wall and flexible wall.

3. The assembly as defined in claim 2 wherein the seam flange (76) includes a plurality of openings or slots (82) into which a corresponding one of the locating tabs may enter providing means for mating the cover (30) to the second wall (102).

4. The assembly as defined in claim 3 wherein the seam flange (76) includes a second plurality of openings (84) which are received about a corresponding latching tab on the housing, the openings (84) and the latching members cooperating to secure the seam flange to the housing.

5. A cover and housing combination: the housing comprising a first wall (100) and an opposite second wall (102), a flexible wall member (106) secured to the first wall (100) defining a space (150) therebetween, one of the first wall (100) and flexible wall member (106) including a plurality of first tabs (112) extending into the space (150), the second wall (102) including a plurality of locating tabs (120) and latching tabs ( 122;124);

the cover including a top portion, and first means, received in the space (150) engageable with the first tabs (112) to provide a snap connection therebetween and a seam portion (42) including second means (76,82) engageable with the locating tabs and third means (76;84) being latched by said latching tabs for securing the seam portion to the housing, the seam portion including a tear seam (80).

6. The cover as defined in claim 5 wherein a hinge flange (60) integrally extends from the top portion and wherein a hinge portion (40) is formed proximate the junction of the hinge flange (60) and the top portion (30), and wherein the second means includes a seam flange (76) formed as an integral part of the cover (30) generally opposite the hinge flange (60) and wherein the tear seam (80) is at the junction of the seam flange (76) to the top portion, the hinge flange (60) includes a plurality of receptacles (70) engagable with a corresponding one of the first tabs (112) when the hinge flange (60) is inserted between the first wall and flexible wall.

7. The cover as defined in claim 6 wherein the seam flange (76) includes a plurality of openings or slots (82) into which a corresponding one of the locating tabs may enter providing means for mating the cover (30) to the second wall (102).

8. The cover as defined in claim 7 wherein the seam flange (76) includes a second plurality of openings (84) which are received about a corresponding latching tab on the housing, the openings (84) and the latching members cooperating to secure the seam flange to the housing.

9. An assembly for an air bag comprising:
a housing comprising: a first wall and an opposite second wall, a flexible wall member secured to the first wall defining a space therebetween, one of the first wall and flexible wall member including a plurality of first tabs extending into the space, the second wall including a plurality of locating tabs and latching tabs extending therefrom;
cover means, interfitting in the space and with the locating tabs and latching tabs, for enclosing the housing.

10. The assembly as defined in claim 9 wherein the cover means includes first means, received in the space, including a hinge portion engageable with the first tabs to provide a snap connection therebetween and including second means engageable with the locating tabs and third means being latched by said latching tabs to secure a seam portion to the housing, the seam portion including a tear seam which tears apart in response to deployment forces generated by an inflating air bag.

11. The assembly as defined in claim 9 wherein the cover means comprises a cover, a hinge flange extending from the cover, the hinge portion is formed proximate a junction of the hinge flange and the cover, and wherein the second means includes a seam flange formed as an integral part of the cover generally opposite the hinge flange the tear seam at the junction of the seam flange to the cover, the hinge flange including a plurality of receptacles engageable with a corresponding one of the first tabs when the hinge flange is inserted between the first wall and flexible wall.

12. The assembly as defined in claim 11 wherein the seam flange includes a plurality of openings or slots into which a corresponding one of the locating tabs may enter providing means for mating the cover to the second wall.

13. The assembly as defined in claim 12 wherein the seam flange includes a second plurality of openings which are received about a corresponding latching tabs on the housing, the openings and the latching members cooperating to secure the seam flange to the housing.

* * * * *